US 7,435,476 B2

(12) United States Patent
Viswanathan et al.

(10) Patent No.: US 7,435,476 B2
(45) Date of Patent: Oct. 14, 2008

(54) FUNCTIONALIZED NANOTUBE MATERIAL FOR SUPERCAPACITOR ELECTRODES

(75) Inventors: Sriram Viswanathan, Columbus, OH (US); Toshio Tokune, Columbus, OH (US)

(73) Assignees: Honda Motor Co., Ltd., Tokyo (JP); Ohio State University Research Foundation, The, Columbus, OH (US)

( * ) Notice: Subject to any disclaimer, the term of this patent is extended or adjusted under 35 U.S.C. 154(b) by 294 days.

(21) Appl. No.: 11/248,299

(22) Filed: Oct. 13, 2005

(65) Prior Publication Data

US 2008/0013258 A1 Jan. 17, 2008

(51) Int. Cl.
*B32B 9/00* (2006.01)
(52) U.S. Cl. ........................ 428/367; 428/398; 428/408; 423/445 B; 423/460
(58) Field of Classification Search ......... 361/502–504, 361/510–512, 321.4, 321.5, 303–305; 29/25.41, 29/25.42; 428/367, 398, 408; 423/445 B, 423/460
See application file for complete search history.

(56) References Cited

U.S. PATENT DOCUMENTS

| | | | |
|---|---|---|---|
| 5,424,054 A | 6/1995 | Bethune et al. | |
| 6,221,330 B1 | 4/2001 | Moy et al. | |
| 6,454,816 B1 | 9/2002 | Lee et al. | |
| 6,835,366 B1 | 12/2004 | Margrave et al. | |
| 6,988,925 B2 * | 1/2006 | Arthur et al. | 445/46 |
| 7,061,749 B2 * | 6/2006 | Liu et al. | 361/502 |
| 7,241,496 B2 * | 7/2007 | Chen et al. | 428/367 |
| 7,375,369 B2 * | 5/2008 | Sen et al. | 257/40 |
| 7,387,735 B2 * | 6/2008 | Park et al. | 210/651 |
| 2002/0008956 A1 | 1/2002 | Niu | |
| 2003/0164427 A1 | 9/2003 | Glatkowski et al. | |
| 2004/0106041 A1 | 6/2004 | Reynolds et al. | |
| 2005/0142898 A1 | 6/2005 | Kim et al. | |

FOREIGN PATENT DOCUMENTS

EP 1146527 A2 10/2001

OTHER PUBLICATIONS

Franckowiak, E.; Metenier, K.; Vertagna, V.; Beguin, F.; Supercapacitor electrodes from multiwalled carbon nanotubes; Applied Physics Letters, vol. 77, No. 15, pp. 2421-2423 (Oct. 2000); American Institute of Physics.
Frackowiak, E.; Beguin, F.; Carbon materials for the electrochemical storage of energy in capacitors; Carbon, vol. 39, pp. 937-950, (2001); Elsevier Science, Ltd.
Ma, R.Z.; Liang, J.; Wei, B.Q.; Zhang, B.; Xu, C.L.; Wu, D.H.; Study of electrochemical capacitors utilizing carbon nanotube electrodes; J. of Power Sources, vol. 84, pp. 126-129 (1999); Elsevier Science S.A.

(Continued)

*Primary Examiner*—Nguyen T Ha
(74) *Attorney, Agent, or Firm*—Samuel P. Burkholder; Mark E. Duell

(57) ABSTRACT

The present teachings are directed toward compositions of supercapacitor electrode materials containing a functionalized carbon nanotube-containing material substantially free of binder material and methods for preparing the functionalized carbon nanotube-containing material.

20 Claims, 2 Drawing Sheets

OTHER PUBLICATIONS

Niu, C.; Sichel, E.K.; Hoch, R.; Moy, D.; Tennent, H.; High power electrochemical capacitors based on carbon nanotube electrodes; Applied Physics Letters, vol. 70, No. 11, pp. 1480-1482 (Mar. 1997); American Institute of Physics.

Guo, T.; Nikolaev, P.; Thess, A.; Colbert, D.T.; Smalley, R.E.; Catalytic growth of single-walled nanotubes by laser vaporization; Chem. Phys. Lett., vol. 243, pp. 49-54 (Sep. 1995); Elsevier Science B.V.

Thess, A.; Lee, R.; Nikolaev, P.; Dai, H.; Petit, P.; Robert, J.; Xu, C.; Lee, Y.H.; Kim, S.G.; Rinzler, A.G.; Colbert, D.T.; Scuseria, G.E.; Tomanek, D.; Fischer, J.E.; Smalley, R.E.; Crystalline Ropes of Metallic Carbon Nanotubes; Science, vol. 273, pp. 483-487 (Jul. 1996).

* cited by examiner

FUNCTIONALIZED NANOTUBE MATERIAL FOR SUPERCAPACITOR ELECTRODES

BACKGROUND

1. Field of the Invention

This invention relates to functionalized carbon nanotubes and material containing functionalized carbon nanotubes suitable for use as electrodes and as electrode material in supercapacitors.

2. Discussion of the Related Art

It is well known in the art that carbon nanotubes can exhibit semiconducting or metallic behavior. Additional properties that make carbon nanotubes of interest are high surface area, high electrical conductivity, high thermal conductivity and stability, and good mechanical properties. See U.S. Patent Application Publication US 2003/0164427 A1.

Supercapacitors typically have specific capacitance of greater than 100 F/g, as opposed to conventional capacitors with specific capacitance on the order of only several F/g. Supercapacitors refer to, without limitation, electrochemical capacitors, electric double layer capacitors and ultracapacitors.

Capacitor electrodes prepared from carbon nanotube-containing materials can exhibit high levels of performance. However, for supercapacitor applications even higher levels of capacitance performance are desirable or required.

A need exists, therefore, for nanotube-containing materials for use in as electrodes in supercapacitors, or capacitors, exhibiting higher levels of capacitance.

SUMMARY

The present teachings meet the needs for supercapacitor electrode materials exhibiting higher capacitance levels by providing compositions of functionalized carbon nanotube-containing materials suitable for electrodes for supercapacitors.

The present teachings include a supercapacitor having one or more electrodes made of a functionalized carbon nanotube-containing material, and an organic electrolyte solution. Further taught is a supercapacitor electrode having a functionalized carbon nanotube-containing material substantially free of binder material.

A method of producing electrodes by oxidizing carbon nanotube-containing material, contacting the oxidized carbon nanotube-containing material with functional groups to form functionalized carbon nanotube-containing material, and preparing electrodes from the functionalized carbon nanotube-containing material is also provided in the present teachings. The oxidizing and contacting steps can be one step, or separate method steps.

The present teachings also include a method of producing supercapacitor electrodes by contacting carbon nanotubes with an oxidizer to form oxidized carbon nanotubes. Functional groups are then added to the oxidized carbon nanotubes to form functionalized carbon nanotubes which can then be formed into a film. The film can then be prepared into a supercapacitor electrode containing the functionalized carbon nanotube film.

BRIEF DESCRIPTION OF THE DRAWINGS

The accompanying drawing, which is included to provide a further understanding of the present teachings and is incorporated in and constitute a part of this specification, illustrate various embodiments of the present teachings and together with the detailed description serve to explain the principles of the present teachings. In the drawing.

DETAILED DESCRIPTION

Figure 1:
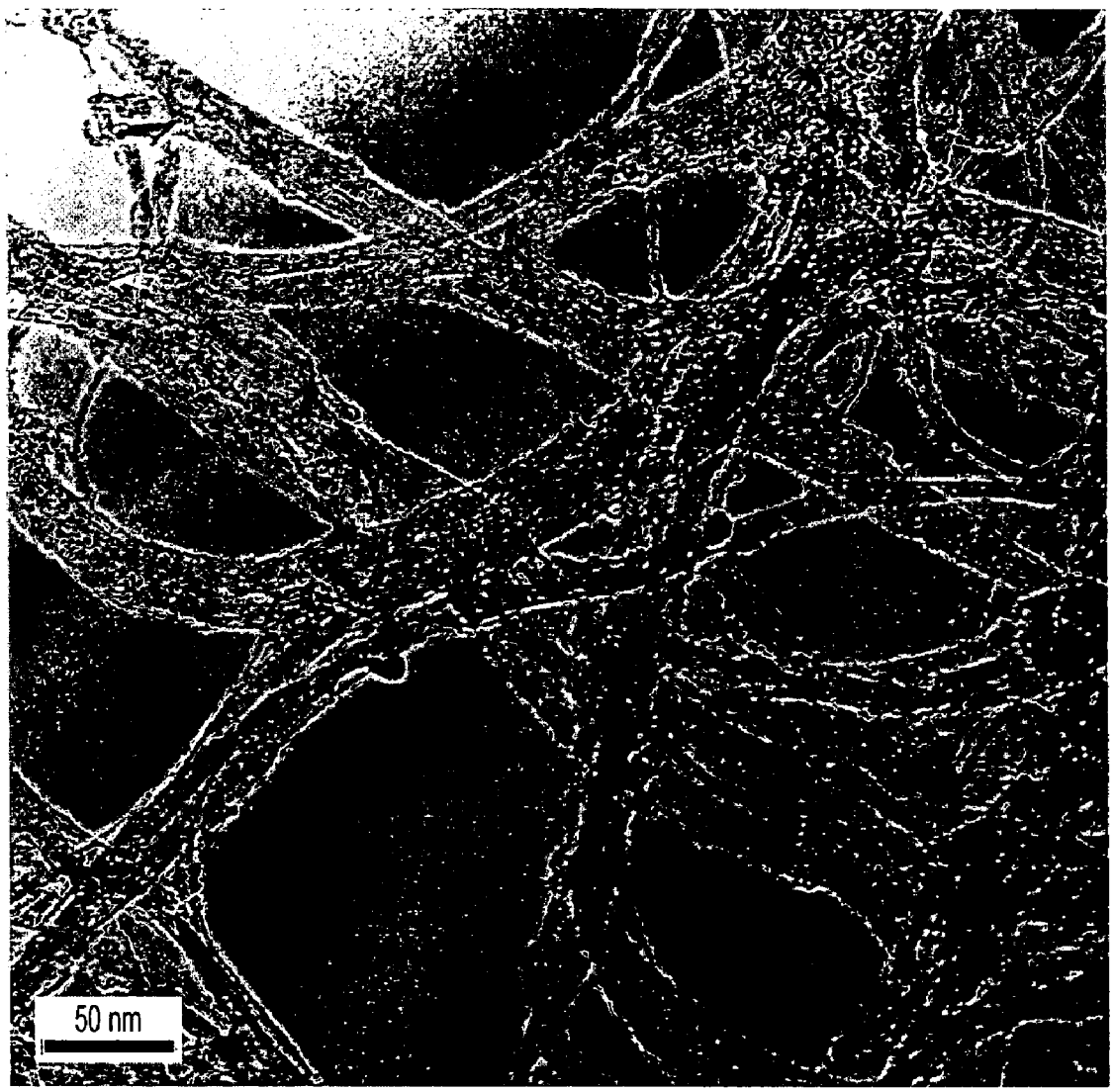
FIG. 1 is a TEM micrograph of purified HiPCO single-walled carbon nanotubes.

The present teachings are directed to materials composed of functionalized carbon nanotubes, methods of preparing those materials, use of those materials as electrodes in supercapacitors, and supercapacitors including functionalized carbon nanotube-containing electrodes.

A supercapacitor having one or more electrodes including a functionalized carbon nanotube-containing material, and an organic electrolyte solution is provided by the present teachings. The functionalized carbon nanotube-containing material can be substantially free of any binder material. Binder material, such as, for example, polytetrafluoroethylene (PTFE), are typically added to carbon nanotube-containing materials to facilitate the formation of pellets or films.

The organic electrolyte solution includes a non-aqueous solvent and an ionic salt. The non-aqueous solvent can include at least one member selected from the group consisting of propylene carbonate, ethylene carbonate, sulfolane and acetonitrile. The ionic salt can include at least one member selected from the group consisting of triethylmethylammonium tetrafluoroborate, triethylmethylammonium hexafluorophosphate, tetraethylammonium tetrafluoroborate, tetraethylammonium hexafluorophosphate, tetrabutylammonium tetrafluoroborate and tetrabutylammonium hexafluorophosphate. One of skill in the art will recognize the numerous possible variations in the combination of alkyl groups in the ammonium salt. One non-aqueous solvent and ionic salt combination of particular interest is propylene carbonate and triethylmethylammonium tetrafluoroborate.

A supercapacitor according to the present teachings can include an electrolyte solution that can sustain voltages of greater than plus/minus about 1.25 V, or greater than plus/minus about 1.5 V, or greater than plus/minus 2.0 V. The organic electrolyte solutions set forth above can be utilized for some of the various embodiments of the present teachings.

The functionalized carbon nanotube-containing material can include carbon nanotubes having functional groups attached thereto. Those functional groups can be attached to the unfunctionalized carbon nanotubes during oxidation of the unfunctionalized carbon nanotubes.

According to the present teachings, carbon nanotubes functionalized as set forth herein can exhibit increased aqueous wettability properties and dispersability in aqueous solutions over similar unfunctionalized carbon nanotubes. Dispersability may also be referred to as the apparent solubility of the functionalized carbon nanotubes in aqueous solutions. These soluble functionalized carbon nanotubes can be used for preparing conducting polymer-carbon nanotube composites, for example, composites prepared from, for instance, PEDOT or polyaniline added to the soluble functionalized carbon nanotubes. Additionally, further enhancements in supercapacitance can be obtained by the chemically or electrochemically polymerization of conducting polymers on or around the soluble functionalized carbon nanotubes.

The unfunctionalized carbon nanotubes utilized can be nanotubes that include single-walled carbon nanotubes and multiple-walled carbon nanotubes. Of particular interest are single-walled nanotubes. The carbon nanotubes can have an outer diameter ranging from about 0.5 nm to about 1 nm, or ranging from about 1 nm to about 10 nm, or ranging from about 10 nm to about 25 nm, or ranging from about 25 nm to about 45 nm, or ranging from about 45 nm to about 100 nm. The carbon nanotubes can have average bundle sizes ranging from about 20 nm to about 30 nm. The carbon nanotubes can have average lengths ranging from about 50 nm to about 1 mm.

Suitable nanotubes can be formed by any suitable method, for example, laser ablation of carbon, decomposition of a hydrocarbon, or arcing between two carbon graphite electrodes. Numerous references describe suitable methods and starting materials to produce suitable carbon nanotubes. See, for example, U.S. Pat. Nos. 5,424,054; 6,221,330 and 6,835,366; Smalley, R. E., et al., *Chem. Phys. Lett.* 243, pp. 1-12 (1995); and Smalley, R. E., et al., *Science,* 273, pp. 483-487 (1996). Suitable carbon nanotubes are commercially available from a number of sources. Single-walled nanotubes (herein referred to as "SWNT") are available from Carbon Nanotechnologies, Inc. of Houston, Tex.

The functional groups added to the unfunctionalized carbon nanotubes can include at least one member selected from the group consisting of hydroxyl groups, carboxyl groups, alkoxyl groups and mixtures thereof. Of particular interest are hydroxyl and carboxyl groups. The extent of functionalization can be measured by observing the appropriate hydroxyl and/or carboxyl bands of the IR spectrum.

The functionalized carbon nanotube-containing material can be in the form of a film. The film can be produced by heating a dispersion of the functionalized carbon nanotube-containing material to a temperature sufficient to produce a film, for instance, a temperature ranging from about 90 C. to about 110 C. The removal of water or solvent from the dispersion of functionalized carbon nanotube-containing material to form a film can be facilitated by use of a PTFE-coated evaporation vessel.

Another embodiment of the present teachings includes a capacitor electrode containing a functionalized carbon nanotube-containing material substantially free of binder material. The functionalized carbon nanotube-containing material can include carbon nanotubes having functional groups attached thereto during oxidation of the carbon nanotubes.

Yet another embodiment of the present teachings includes a method of producing electrodes which can include oxidizing carbon nanotube-containing material, contacting the oxidized carbon nanotube-containing material with functional groups to form functionalized carbon nanotube-containing material, and preparing electrodes from the functionalized carbon nanotube-containing material.

The method can further include forming a film of the functionalized carbon nanotube-containing material.

According to the method of producing electrodes, the oxidizing step can be containing the carbon nanotube-containing material with an oxidizer. Suitable oxidizers can be at least one member selected from the group consisting of bromates, chlorates, chromates, iodates, nitrates, nitrites, perborates, percarbonates, perchlorates, periodates, permanganates, peroxides and persulfates. Another suitable oxidizer is nitric acid.

Additionally, in some embodiments of the present teachings, the contacting step can occur at the same time as the oxidizing step, or contacting the carbon nanotubes with the functional groups can be a separate process step.

The functional groups suitable for the present method include at least one member selected from the group consisting of hydroxyl group, carboxyl group, alkoxy group and mixtures thereof.

The film forming step can include heating the functionalized carbon nanotube-containing material to a temperature sufficient to form a film. An example of a suitable sufficient temperature for forming a film can include a temperature ranging between about 90 C. and about 110 C.

The carbon nanotube-containing material suitable for the present method includes single-walled carbon nanotubes. Such single-walled carbon nanotubes can have average bundle sizes ranging from about 20 nm to about 30 nm, and can have average lengths ranging from about 50 nm to about 1 mm.

Another embodiment of the present teachings includes a method of producing supercapacitor electrodes including contacting carbon nanotubes with an oxidizer to form oxidized carbon nanotubes, and adding functional groups to the oxidized carbon nanotubes to form functionalized carbon nanotubes. The functionalized carbon nanotubes can then be formed into a film, and a supercapacitor electrode can be prepared from the functionalized carbon nanotube film.

The oxidizer utilized in the present method can include at least one member selected from the group consisting of bromates, chlorates, chromates, iodates, nitrates, nitrites, perborates, percarbonates, perchlorates, periodates, permanganates, peroxides and persulfates. Of particular interest is use of nitric acid as the oxidizer of the present method.

The functional groups utilized in the present method can include at least one member selected from the group consisting of hydroxyl group, carboxyl group, alkoxy group and mixtures thereof. Hydroxyl and carboxyl groups are of particular interest.

The film forming step of the present method can be accomplished by heating the functionalized carbon nanotubes to a temperature sufficient to form a film, such as a temperature ranging between about 90 C. and about 110 C.

The carbon nanotube-containing material suitable for the present methods can include single-walled carbon nanotubes. The single-walled carbon nanotubes used in the method can have average bundle sizes ranging from about 20 nm to about 30 nm, and can have average lengths ranging from about 50 nm to about 1 mm.

As used herein, a reference electrode refers to a standard silver/silver chloride/sodium chloride electrode as known to those in the art.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the principles of the present teachings are exemplary and should not be construed as limiting the scope of the present teachings.

EXAMPLES

Example 1

A sample of HiPCO carbon nanotubes (obtained from Carbon Nanotechnologies, Inc. of Houston, Tex.) was heated in air at 325 C. for ninety minutes. After the heat treatment, the cooled carbon nanotubes were stirred in concentrated HCl for 14 hours. The carbon nanotubes were filtered out of the acid solution and washed well with deionized water. The washed carbon nanotubes were dried at 110 C. for 3 hours, and then heated to 150 C. in a $10^{-3}$ torr vacuum for 12 hours.

A TEM micrograph of the treated carbon nanotubes is presented in FIG. 1. Average bundle size of the treated carbon nanotubes is between about 20 and about 30 nm.

Example 2

Nitric acid was used in a range of concentrations to analyze the acid concentration effect on the functionalized carbon nanotube material.

Four different samples of the carbon nanotubes prepared in Example 1 above were separately refluxed at 100 C. for 24 hours in different molar concentrations of nitric acid, except for the concentrated nitric acid sample which was refluxed for one hour. The nitric acid concentrations were 3.0 M, 6.0 M, 10.0 M, and concentrated $HNO_3$ (70% by volume). The nanotubes were then filtered off, washed with deionized water, and then centrifuged at 5000 rpm for 15 minutes to remove insoluble nanotubes.

Aqueous dispersions of the soluble nanotubes were then cast in PTFE-coated evaporation vessels, heated in a 100 C. oven with a gentle flow of air for 12 hours to remove water, and formed into films with approximate thicknesses of about 20 to about 30 microns.

Each film was then adhered to an aluminum electrode using a colloidal graphite paste and dried at 150 C. in a $10^{-3}$ torr vacuum for at least 12 hours. The aluminum electrodes were prepared by wiping with ethanol and acetone, etching with 0.2 N NaOH solution for five minutes, washing with deionized water, and then drying overnight at 90 C. in flowing air before adhering the film.

An additional electrode was prepared using carbon nanotube as prepared in Example 1 above without further treatment and 10 wt. % polytetrafluoroethylene (PTFE) as a binder. The nanotube/binder mixture was mixed with a mortar and pestle, and then hydraulically pressed into a pellet with a nominal thickness of about 20 to about 30 microns.

The cyclic voltammetric test cell utilized a standard Ag/AgCl reference electrode, a platinized Pt counter electrode, with the samples attached to an aluminum strip electrode using colloidal graphite paste. The test cell was purged with a flow of argon gas. The electrolyte solution was 0.1 M triethylmethylammonium tetrafluoroborate in propylene carbonate.

Figure 2:
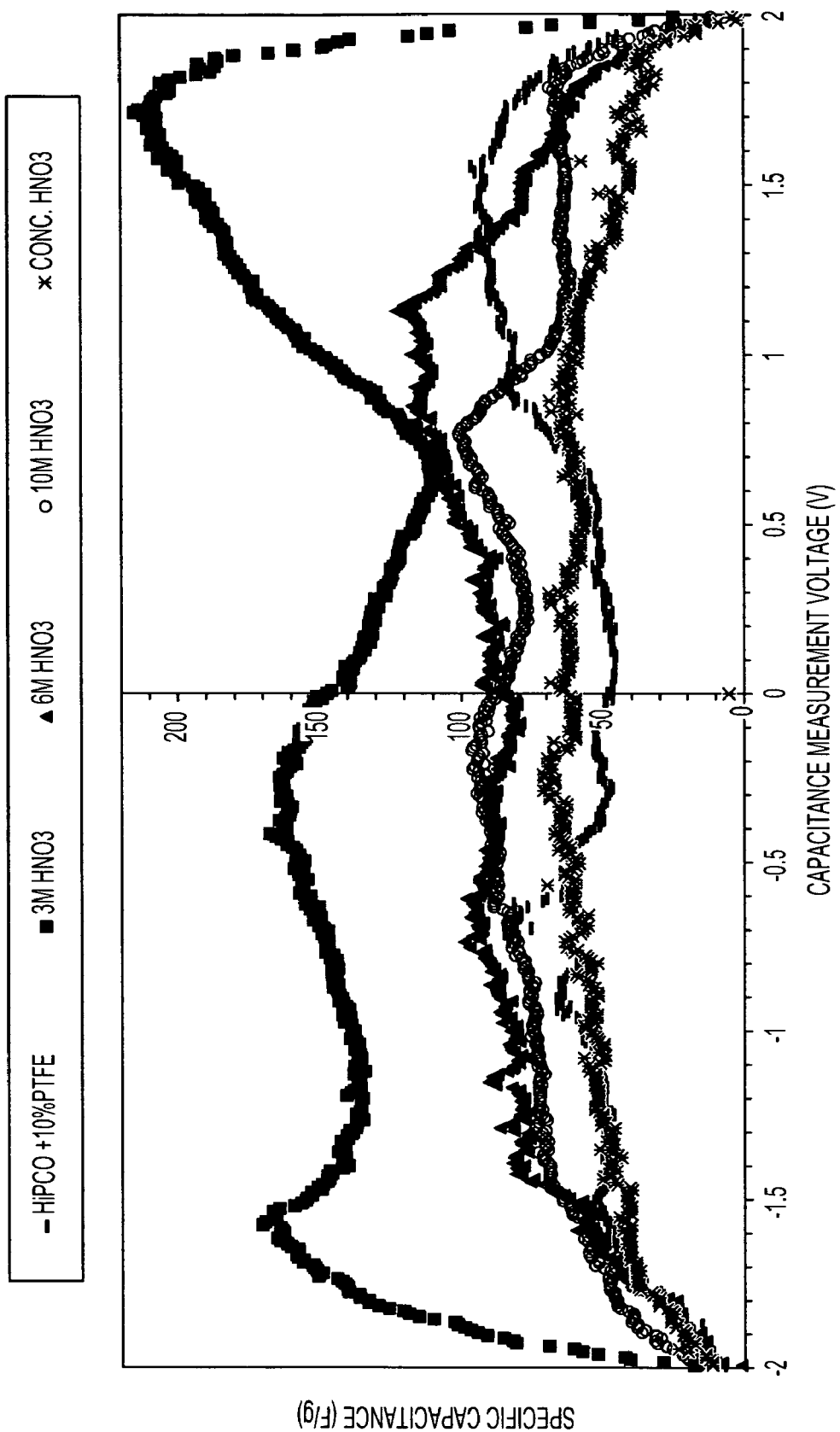
FIG. 2 is a plot of current versus specific capacitance per mass for supercapacitor electrodes containing carbon nanotube-containing material treated with various concentrations of nitric acid.

The samples were electrochemically activated by cycling from 0 to −2 V at 1 mV/s for two cycles. The capacitance of all five samples was then measured by cycling between about +2.0 V and about −2.0 V at a scan rate of 1 mV/s, with the capacitance calculated from the second cycle measurements. The results are presented in the graph of FIG. 2.

The nanotube yield, solubility in water and the intensity of the carboxyl ($1735\ cm^{-1}$) and hydroxyl ($3450\ cm^{-1}$) peak heights were also analyzed. The results are presented below in Table 1.

TABLE 1

| Sample | Yield of Soluble Nanotubes (%) | Solubility (mg/mL $H_2O$) | $1735\ cm^{-1}$ peak height (arb units) | $3450\ cm^{-1}$ peak height (arb units) |
|---|---|---|---|---|
| Example 1 | n/a | 0.0 | 0.0 | 0.0 |
| 3 M Nitric Acid | 70.5 | 0.75 | 0.06 | 0.25 |
| 6 M Nitric Acid | 68.3 | 0.88 | 0.09 | 0.35 |
| 10 M Nitric Acid | 60.3 | 1.10 | 0.115 | 0.50 |
| Conc. Nitric Acid | 21.2 | 1.24 | 0.135 | 0.65 |

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What we claim is:

1. A method of producing electrodes comprising:
   chemically oxidizing carbon nanotube-containing material at a temperature of less than about 200 C.;
   contacting the oxidized carbon nanotube-containing material with functional groups to form functionalized carbon nanotube-containing material; and
   preparing electrodes from the functionalized carbon nanotube-containing material, wherein the carbon nanotube-containing material is substantially free of binder materials.

2. The method according to claim 1, further comprising
   forming a film of the functionalized carbon nanotube-containing material.

3. The method according to claim 2, wherein the film forming step comprises heating the functionalized carbon nanotube-containing material to a temperature sufficient to form a film.

4. The method according to claim 3, wherein the temperature comprises a temperature ranging between about 90 C. and about 110 C.

5. The method according to claim 1, wherein oxidizing comprises contacting the carbon nanotube-containing material with an oxidizer at a temperature of less than about 100 C.

6. The method according to claim 5, wherein the oxidizer comprises at least one member selected from the group consisting of bromates, chlorates, chromates, iodates, nitrates, nitrites, perborates, percarbonates, perchlorates, periodates, permanganates, peroxides and persulfates.

7. The method according to claim 5, wherein the oxidizer comprises nitric acid.

8. The method according to claim 1, wherein the functional groups comprise at least one member selected from the group consisting of hydroxyl group, carboxyl group, alkoxy group and mixtures thereof.

9. The method according to claim 1, wherein the carbon nanotube-containing material comprises single-walled carbon nanotubes.

10. The method according to claim 9, wherein the single-walled carbon nanotubes have average bundle sizes ranging from about 20 nm to about 30 nm.

11. The method according to claim 9, wherein the single-walled carbon nanotubes have average lengths ranging from about 50 nm to about 1 mm.

12. A method of producing supercapacitor electrodes comprising:
contacting carbon nanotubes with an oxidizer to form oxidized carbon nanotubes at a temperature of less than about 200 C.;
adding functional groups to the oxidized carbon nanotubes to form functionalized carbon nanotubes;
forming the functionalized carbon nanotubes into a film; and
preparing a supercapacitor electrode from the functionalized carbon nanotube film,
wherein the functionalized carbon nanotubes are substantially free of binder materials.

13. The method according to claim 12, wherein the oxidizer comprises at least one member selected from the group consisting of bromates, chlorates, chromates, iodates, nitrates, nitrites, perborates, percarbonates, perchlorates, periodates, permanganates, peroxides and persulfates.

14. The method according to claim 13, wherein the oxidizer comprises nitric acid.

15. The method according to claim 12, wherein the functional groups comprise at least one member selected from the group consisting of hydroxyl group, carboxyl group, alkoxy group and mixtures thereof.

16. The method according to claim 12, wherein forming comprises heating the functionalized carbon nanotubes to a temperature sufficient to form a film.

17. The method according to claim 16, wherein the temperature comprises a temperature ranging between about 90 C. and about 110 C.

18. The method according to claim 12, wherein the carbon nanotube-containing material comprises single-walled carbon nanotubes.

19. The method according to claim 18, wherein the single-walled carbon nanotubes have average bundle sizes ranging from about 20 nm to about 30 nm.

20. The method according to claim 18, wherein the single-walled carbon nanotubes have average lengths ranging from about 50 nm to about 1 mm.

* * * * *